United States Patent [19]

Boultinghouse

[11] 4,296,151

[45] Oct. 20, 1981

[54] FLUORINATED POLYMERIC SURFACES

[75] Inventor: Harold D. Boultinghouse, Bartlesville, Okla.

[73] Assignee: Phillips Petroleum Company, Bartlesville, Okla.

[21] Appl. No.: 158,768

[22] Filed: Jun. 12, 1980

Related U.S. Application Data

[62] Division of Ser. No. 968,713, Dec. 12, 1978, abandoned.

[51] Int. Cl.$^3$ .......................... B05D 3/00; B05D 3/12
[52] U.S. Cl. .............................. 427/255.1; 427/248.1; 427/255.4; 427/322; 427/384; 427/402; 427/412.1; 525/356; 525/357; 525/358
[58] Field of Search .................. 427/255.1, 255.4, 322, 427/384, 248.1, 402; 525/356, 357, 358

[56] References Cited

U.S. PATENT DOCUMENTS

| | | | |
|---|---|---|---|
| 2,811,468 | 10/1957 | Joffre | 117/95 |
| 3,647,613 | 3/1972 | Scotland | 161/165 |
| 3,935,329 | 1/1976 | Reilly et al. | 427/322 |
| 3,940,520 | 2/1976 | Dixon et al. | 427/322 |
| 4,009,304 | 2/1977 | Dixon et al. | 427/322 |
| 4,237,156 | 12/1980 | Boultinghouse | 427/255.1 |

*Primary Examiner*—William F. Hamrock

[57] ABSTRACT

Surfaces of articles formed from (1) normally solid polymers of aliphatic mono-1-olefins and (2) elastomeric and resinous polymers of conjugated dienes and vinyl-substituted aromatic compounds are conditioned by contact with a fluorine-containing gas under conditions and for a period of time sufficient to render the surface receptive to adhesives, coatings, paints, inks, decorations, and the like. The fluorine-containing gas can be pure or admixed with up to about 99 volume percent inert gas.

10 Claims, No Drawings

FLUORINATED POLYMERIC SURFACES

This application is a division of my copending application having Ser. No. 968,713, filed Dec. 12, 1978 abandoned.

This invention relates to the treatment of polymeric surfaces. In accordance with another aspect, this invention relates to a process for the fluorination of surfaces of polyolefins and copolymers of conjugated dienes and vinyl aromatic compounds. In accordance with another aspect, this invention relates to a process for treating the surfaces of articles formed from polyolefins and copolymers of conjugated dienes and vinyl aromatic compounds with a fluroine-containing gas to render the surfaces receptive to adhesives, coatings, paints, inks, decorations, and the like. In accordance with a further aspect, this invention relates to articles formed from polyolefins and copolymers of conjugated dienes and vinyl aromatic compounds having surfaces receptive to adhesives, coatings, paints, inks, decorations, and the like.

Some of the most promising polymers developed in recent years are the polyolefins and the elastomeric and resinous copolymers of conjugated dienes and vinyl aromatic compounds. These polymers exhibit desirable properties in behavior against chemicals, as well as in thermal properties. In addition, these polymers have mechanical properties that make them useful for many new applications. In accordance with the invention, a process is provided for producing olefin, conjugated diene, and vinyl aromatic polymers that are receptive to adhesives, coatings, paints, inks, decorations, and the like.

An object of this invention is to provide a process for the treatment of polymeric surfaces.

A further object of this invention is to provide a polyolefin surface receptive to a second material.

A still further object of this invention is to provide a surface of conjugated diene and vinyl aromatic compound copolymers receptive to a second material.

A further object of this invention is to provide a process for treating surfaces of chemically inert polymers to render the surfaces receptive to a second material.

Other objects and aspects, as well as the several advantages of the invention, will become apparent to those skilled in the art from the following detailed description of the invention, the examples, and the appended claims.

In accordance with the invention, a process is provided for treating a polymeric surface which comprises contacting said surface with a fluorine-containing gas under conditions and for a period of time sufficient to render the surface receptive to adhesives, coatings, paints, inks, decorations, and the like.

Further, in accordance with the invention, polymer compositions receptive to a second material such as adhesives, coatings, paints, inks, decorations, and the like are provided comprising fluorinated surfaces of polyolefins and conjugated diene and vinyl aromatic copolymers.

In one preferred embodiment of the invention, articles formed from polyolefins are rendered receptive to inks by conditioning the articles in an ambient comprising fluorine and subsequently printing.

In another preferred embodiment, articles formed from copolymers of conjugated dienes and vinyl-substituted aromatic compounds are rendered receptive to adhesives, coatings, paints, inks, decorations, and the like by conditioning the articles in an ambient comprising fluorine and subsequently contacting the treated article with a second material for adherence to the fluorine-treated surface.

According to the practice of this invention, shaped articles fabricated from normally solid polymers of aliphatic mono-1-olefins and normally solid copolymers based on diolefins are treated with a gaseous fluorine-containing ambient to render the shaped articles receptive to inks, paints, decorations, etc.

The polymers of the invention can be blended with various additives such as extenders, fillers, pigments, processing aids, stabilizers, other polymers, and the like to produce a variety of compositions. The polymers or polymer-containing compositions can be converted into molded articles, fibers, films, etc., by employing conventional fabricating equipment such as extruders, blow molders, thermoformers, injection molders, and the like.

The polymeric surfaces can be on solid objects molded from polyolefins or polymers of conjugated dienes and vinyl aromatic compounds, on objects coated with these polymers, on laminates of the polymers with solid materials such as fiberglass, fabric, cloth, etc., or articles made from polymers which are either unfilled or filled with chopped fiberglass. The presently preferred polymers are polyethylene and a styrene/butadiene branch block copolymer.

In practicing the invention a shaped polymeric article is exposed to fluorine gas alone or in combination with a gas inert in the process such as nitrogen or helium, preferably nitrogen because of its relatively low cost. The amount of inert gas employed can range from zero to about 99 volume percent. Ordinarily, the amount of inert gas employed ranges from about 10 to about 99 volume percent. One aspect of diluting fluorine gas with an inert gas is to increase the reaction time needed to achieve the desired effect, e.g., render the exposed polymeric surfaces more polar in chemical nature. The polar nature of the treated surfaces renders them more receptive to adhesives, coatings, paints, inks, decorations, etc., than the untreated surfaces. Lengthening the reaction time by employing diluted fluorine gas can be advantageous since it enables the operator to more closely regulate the degree of treatment afforded the polymer surfaces.

The reaction time employed at a moderate temperature can range from about 30 seconds to about 30 minutes or longer depending upon the composition of treating gas and the shape of the polymeric article. To achieve comparable results, less time is required with pure fluorine than with a composition, for example, consisting of one volume percent fluorine and 99 volume percent nitrogen. Intricately shaped articles and/or hollow articles can require somewhat longer treating times than film, fibers, etc., for example, to be sure that the treating gas contacts all portions of the object sufficiently long to achieve the desired effect. By moderate temperature in this invention is meant temperatures ranging from about 15° C. to about 100° C. Lower temperatures can be employed, if desired, but they can increase the treating time beyond that desired in a commercial venture. Higher temperatures can be employed but due to the increased reaction rate that results, a possibility of uncontrollable overtreating becomes more likely.

For purposes of economy and safety, the treating process generally takes place in an enclosed area with means provided to position the molded polymeric article(s) within the area. Means are also provided to charge the area with the treating gas, to circulate it, if desired, and to withdraw it for recovery purposes or to safely dispose of it. All fluorine gas is purged from the area, recovered or neutralized, before the treated article(s) are removed. For example, fluorine can be neutralized (removed) by contact with an aqueous solution of sodium carbonate to remove fluorine as a fluorine salt and the inert diluent gas, if used, can be safely vented to the atmosphere.

When a continuous treating process is used, it is envisioned that the shaped articles can be attached to a conveyor which passes into and through a zone containing the gaseous fluorine-containing ambient for a residence time sufficient to effect the desired change on the surfaces of the articles. A disengaging zone can follow the treating zone where fluorine, if still present, can be purged and recovered or disposed of as previously described.

The location of the treating zone with respect to ground level as a base line can vary depending upon the composition of the fluorine-containing ambient. Fluorine is heavier than air whereas nitrogen is slightly lighter than air and helium is substantially lighter than air. When the treating zone is located below ground level (presently preferred), fluorine alone can be used. When diluted gaseous fluorine mixtures are employed, it is calculated for fluorine/nitrogen mixtures that at least 10 volume percent fluorine is needed and for fluorine/helium mixtures that at least 75 volume percent fluorine is needed. When the treating zone is located above ground level, for lighter than air mixtures, it is calculated that the maximum amount of fluorine for fluorine/nitrogen mixtures should be no more than about seven volume percent and for fluorine/helium mixtures the maximum amount of fluorine should not exceed about 70 volume percent.

The location of the treating zones above or below ground level is desirable for safety reasons, as well as taking advantage of the density of the treating gas relative to that of air.

Immediately following the treating process, the articles can be contacted with inks, paints, adhesively attached decorations, and the like to take advantage of the polar surfaces generated by the treatment.

One aspect of diluting fluorine with an inert gas is to increase the reaction time needed to render the exposed shaped polymer surfaces more polar in chemical nature. This lengthening of reaction time is sometimes beneficial since it enables the operator to more closely regulate the degree of treatment afforded the shaped polymer surface.

The proper degree of treatment can be judged by determining when the surfaces become wettable by water and thus become receptive to various coatings such as inks, paints, adhesives, and the like. The polar surfaces generated by the treatment also result in decreased permeation of hydrocarbons, essential oils, and the like through said polar surfaces. This can be advantageous from a packaging or storage viewpoint.

The normally solid polymers of aliphatic mono-1-olefins contemplated in the practice of this invention include, for example, polyethylene, polypropylene, poly(1-butene), copolymers of ethylene with 1-olefins containing from 3 to about 10 carbon atoms per molecule, copolymers of ethylene with polar monomers such as vinyl acetate, ethyl acrylate, and the like, copolymers of propylene with ethylene and with 1-olefins containing from 4 to about 10 carbon atoms per molecule, copolymers of propylene with vinyl monomers including vinyl chloride, and the like. In such copolymers, the comonomer generally constitutes no more than about 20 mole percent of the total polymer. Mixtures of polymers can be employed.

The polymers of the aliphatic mono-1-olefins are commercially available materials. Ethylene polymers can be made, for example, by employing supported chromium oxide catalysts as disclosed in Phillips Petroleum Company's U.S. Pat. No. 2,828,721, which issued Mar. 4, 1958, to Hogan and Banks. Propylene polymers can be made, for example, by employing titanium-containing catalysts in combination with an organoaluminum cocatalyst as disclosed in Phillips Petroleum Company's U.S. Pat. No. 3,502,634, which issued Mar. 27, 1970, to Stefeder and Lautenschlager. Polymers of 1-butene can be made, for example, by employing titanium-containing catalysts in combination with an organoaluminum cocatalyst.

The polymers based on diolefins encompass elastomeric and resinous copolymers prepared in a hydrocarbon diluent from conjugated dienes and monovinyl-substituted aromatic hydrocarbons by employing an organolithium initiator. The polymers can be described as branched block copolymers. The elastomers are disclosed in U.S. Pat. No. 3,281,383, which issued Oct. 25, 1966, to Zelinski and Hsieh.

Monomers which can be used to prepare the polymers of my invention should be hydrocarbons such as conjugated dienes and vinyl-substituted aromatic compounds. The conjugated dienes ordinarily contain from 4 to 12 carbon atoms per molecule and those containing from 4 to 8 carbon atoms are preferred. Examples of such compounds include 1,3-butadiene, isoprene, 2,3-dimethyl-1,3-butadiene, piperylene, 3-butyl-1,3-octadiene, phenyl-1,3-butadiene, and the like. The vinyl-substituted aromatic compounds include styrene, 1-vinylnaphthalene, 2-vinyl-naphthalene, and the alkyl, cycloalkyl, aryl, alkaryl, and aralkyl derivatives thereof in which the total number of carbon atoms in the combined substituents is generally not greater than 12. Examples of such substituted monomers include 3-methylstyrene, 4-n-propylstyrene, 4-cyclohexylstyrene, 4-dodecylstyrene, 2-ethyl-4-benzylstyrene 4-p-tolylstyrene, 4-(4-phenyl-n-butyl) styrene, and the like. The conjugated dienes and the vinyl-substituted aromatic compounds can be polymerized in a suitable manner to form copolymers, block copolymers, and the like. Monomers which are preferred for the practice of my invention are butadiene, isoprene, and styrene. The preferred polymers are those in which the conjugated dienes are present in a major amount.

Presently preferred branched block copolymers are the resinous block copolymers disclosed in U.S. Pat. No. 3,639,517, which issued Feb. 1, 1972, to Kitchen and Szalla, particularly the styrene/butadiene block copolymers. The polymers of the patent can be broadly described as branched block copolymers and are an improvement on the prior art branched block copolymers, such as described in U.S. Pat. 3,281,383, issued to Zelinski et al on Oct. 25, 1966. Zelinski et al have therein conveniently referred to their branched polymers as radial polymers because they have relatively long polymer branches radiating from a nucleus formed from a polyfunctional treating or coupling compound. These radial polymers possess many excellent properties and are particularly described therein as having little, if any, tendency to undergo cold flow, and yet have better processing properties than other polymers of comparable Mooney values prepared by prior art methods. The polymers of the instant invention can also be broadly referred to as radial polymers although they are distinguishable over the prior art radial polymers and possess even more outstanding properties.

The polymers prepared are polymodal, resinous, branched block copolymers and contain from about 70 to 95 weight percent of polymerized monovinyl-substituted aromatic hydrocarbon monomer based on the weight of the total monomers employed. The polymers of this invention when formed into articles not only exhibit surprising and outstanding properties such as impact strength and high environmental stress cracking resistance but are transparent as well. The polymers also exhibit remarkable processability and can be employed in conventional processing equipment with ease.

EXAMPLE I

A tank having a wall thickness of about 0.125 inch (0.32 cm) and dimensions of about 5×5×13 inches (13×13×33 cm) was blow molded from polyethylene having a nominal density of 0.955 g/cc and a melt index of about 0.2 (ASTM D 1238-65T, Condition E). The tank which can be usefully employed, for example, as a gasoline tank for small engines, had an approximate volume of 1.4 gallons (5.3 liters).

The tank was heated to about 200° F. (93° C.), placed in a vented hood, and the air inside the tank was substantially replaced with a mixture consisting of 10 volume percent fluorine and 90 volume percent nitrogen. After about five minutes, the mixture was purged with air and vented to the atmosphere. The tank was then removed and stored for future use.

The interior of the treated tank was slush coated with a liquid organic polysulfide commercially available from the Thiokol Corp. as A-8132, a composition consisting of two separate portions. The operation was carried out by heating the tank, and equal portions of the polysulfide composition to about 140° F. (60° C.). The portions were mixed and sufficient of the mixture was poured into the tank to coat the interior to a thickness of about one-two mils (0.025–0.050 mm). The coating was cured by placing the tank in an oven heated to about 250° F. (120° C.) for five minutes after which the tank was removed and allowed to cool to room temperature. It was found that the coating adhered tenaciously to the treated plastic surface. An untreated tank was similarly coated with the polysulfide material which was cured as before. The coating adhered poorly to the untreated plastic surface.

In another embodiment, a tank was treated inside and out with the 10/90 fluorine/nitrogen ambient in the manner previously described. Both inside and outside of the tank were coated with the polysulfide composition and the coatings cured as before. It was found that the tank was extremely resistant to the effects of a blow torch applied to its exterior. The coated plastic did not melt until sufficient cured polysulfide composition was peeled away from it under contact with the torch, to directly expose the polyethylene surface to the flame. This indicates that a fire retardant polyolefin container with resistance to permeation to hydrocarbons, etc., can be produced by treating the container with the fluorine-containing ambient and then applying a curable organic polysulfide coating to the inner and outer surfaces.

EXAMPLE II

Specimens measuring 4×6×0.010 inches (10×15×0.025 cm) were cut from sheet extruded from a resinous, polymodal 75/25 styrene/butadiene branch block copolymer prepared as described in Example I of U.S. Pat. No. 3,639,517 and a resinous 75/25 styrene/butadiene block copolymer prepared as described in U.S. Pat. No. 3,281,383 and having a melt flow similar to the polymodal copolymer.

Several specimens cut from each of the above styrene/butadiene block copolymer sheets preheated to about 180° F. (82° C.) were placed inside a clean, dry steel container having dimensions of about 9×9×14 inches (23×23×36 cm) and provided with hinged opening in the top and in one side near the bottom through which the samples were inserted. The openings were loosely closed. A valved line connected to a supply of pressurized gas consisting of 10 volume percent fluorine and 90 volume percent nitrogen was attached to a connection located near the bottom of the container. The container was placed inside a vented hood. Sufficient treating gas was charged to the container to displace the air within it, e.g., about 19 liters at ambient temperature and pressure. After five minutes, the hinged doors of the container were opened, the treating gas allowed to vent to the atmosphere, and the samples recovered.

It was found that the treated samples could be readily wetted with water indicating polar surfaces had been generated whereas untreated control samples would not water-wet.

Both treated and untreated samples were then screen printed with a commercially available ink formulated for printing on polystyrene surfaces. Parallel lines about 0.125 inches (3.2 mm) apart were cut at right angles through the dried ink and adhesive tape was applied over a portion of the surfaces. It was found that all the ink was removed from the untreated surfaces whereas essentially all the ink remained on the treated surfaces when the adhesive tape was removed.

I claim:

1. A process for treating a polymeric surface formed from (1) normally solid polymers of aliphatic mono-1-olefins and (2) elastomeric and resinous copolymers of conjugated dienes and vinyl-substituted aromatic compounds which comprises contacting said surface with a fluorine-containing gas under conditions and for a period of time sufficient to render said surface water-wettable and receptive to adherence of a second material selected from adhesives, coatings, paints, inks, decorations, and the like, and then contacting said surface with said second material under conditions which cause said second material to adhere to said fluorinated surface.

2. A process according to claim 1 wherein said polymer is polyethylene or a styrene/butadiene branch block copolymer.

3. A process according to claim 1 wherein said polymer is a molded or shaped article formed from polyethylene or a styrene/butadiene branch block copolymer.

4. A process according to claim 1 wherein said fluorine-containing gas is a mixture of inert gas and fluorine containing up to about 99 volume percent inert gas.

5. A process according to claim 1 wherein conditions include a temperature ranging from about 15° C. to about 100° C., a period of time ranging from about 30 seconds to about 30 minutes, and said fluorine-containing gas is a mixture of fluorine and nitrogen.

6. A process according to claim 5 wherein said polymer is polyethylene or a styrene/butadiene branch block copolymer and said gas is a mixture of about 90 percent nitrogen and about 10 percent fluorine.

7. A process according to claim 1 wherein said polymer is a styrene/butadiene branch block copolymer and said second material is an ink.

8. A process for coating a polymeric surface formed from normally solid polymers of aliphatic mono-1-olefins which comprises contacting said surface with a fluorine-containing gas under conditions and for a period of time sufficient to render said surface water-wettable and receptive to a polysulfide coating, coating said treated surface with a liquid organic polysulfide, and curing said polysulfide coating by heating at an elevated temperature sufficient to form a polysulfide coating that adheres tenaciously to the fluorine-treated polymeric surface.

9. A process according to claim 8 wherein said polymer is a molded or shaped article formed from polyethylene and said fluorine-containing gas is a mixture of inert gas and fluorine containing up to about 99 volume percent inert gas.

10. A process according to claim 8 wherein conditions include a temperature ranging from about 15° C. to about 100° C., a period of time ranging from about 30 seconds to about 30 minutes, and said fluorine-containing gas is a mixture of fluorine and nitrogen.

* * * * *